United States Patent [19]
Shipman et al.

[11] Patent Number: 6,044,581
[45] Date of Patent: Apr. 4, 2000

[54] WATERFOWL DECOY SYSTEM FOR SUSPENSION OVER PREDETERMINED LOCATION

[75] Inventors: Lawrence R. Shipman, Commerce City; Arthur Vos, IV, Fort Collino, both of Colo.

[73] Assignee: Lawrence R. Shipman, Commerce City, Colo.

[21] Appl. No.: 08/999,589

[22] Filed: Dec. 22, 1997

Related U.S. Application Data

[60] Provisional application No. 60/033,850, Dec. 27, 1996.

[51] Int. Cl.⁷ .......................... A01M 31/06; A63H 27/08
[52] U.S. Cl. ............................................. 43/3; 244/153 R
[58] Field of Search ...................... 43/2, 3; 244/153 R, 244/154, 155 R, 155 A

[56] References Cited

U.S. PATENT DOCUMENTS

| | | |
|---|---|---|
| 87,238 | 2/1869 | Bellamy . |
| 747,732 | 12/1903 | Kremer . |
| 810,690 | 1/1906 | Weiss . |
| 814,097 | 3/1906 | Tartsch . |
| 1,468,780 | 9/1923 | Fraser . |
| 1,562,625 | 11/1925 | Fife . |
| 1,714,558 | 5/1929 | Hauff . |
| 2,483,680 | 10/1949 | Timm et al. ................................... 43/3 |
| 2,556,877 | 6/1951 | Howard ................................... 244/153 |
| 3,254,439 | 6/1966 | Hansen ........................................ 43/3 |
| 3,317,165 | 5/1967 | Zobl, III ................................ 244/155 |
| 3,436,856 | 4/1969 | Miller ............................................ 43/3 |
| 4,141,167 | 2/1979 | Muehl ......................................... 43/2 |
| 5,188,314 | 2/1993 | Peters ....................................... 244/31 |

FOREIGN PATENT DOCUMENTS 406386  3/1934  United Kingdom ......................... 43/2

*Primary Examiner*—Jack W. Lavinder
*Attorney, Agent, or Firm*—Sheridan Ross P.C.

[57] ABSTRACT

A waterfowl decoy system is provided comprising a waterfowl decoy with a specific gravity which is less than air and controlled by an apparatus which causes the waterfowl decoy to mimic different stages of a landing bird. The system includes a waterfowl decoy with orientation means enabling the user to control the flight orientation and posture of the waterfowl decoy.

18 Claims, 4 Drawing Sheets

WATERFOWL DECOY SYSTEM FOR SUSPENSION OVER PREDETERMINED LOCATION

The present application claims priority from pending U.S. Provisional Application Ser. No. 60/033,850 filed Dec. 27, 1996.

FIELD OF THE INVENTION

The present invention relates to a waterfowl decoy system and waterfowl decoy apparatus. More particularly, the invention relates to a waterfowl decoy system having at least one waterfowl decoy with a specific gravity which is less than that of air, controlled by an apparatus which brings the waterfowl decoy from an elevated position in the air towards a predetermined location on the Earth's surface thus mimicking the flight of a landing bird.

BACKGROUND OF THE INVENTION

Hunting and viewing of birds are challenging and invigorating sports. The challenge these sports present often requires the use of decoys to attract birds near a particular location. Birds in flight are often attracted and flock to the location of other landing birds. Unfortunately, current decoy designs do not simulate the flight landing orientations of birds or movement of birds towards a particular location. Rather, current waterfowl decoys are positioned stationary on the ground or in water, thus having little resemblance to live waterfowl and the movement associated therewith.

U.S. Pat. No. 87,238 by Bellamy discloses an inflatable toy bird inflated with a gas or vapor, which when inflated, will float in the air. The toy bird is held by means of a string attached to its underside. However, the design does not allow for controlling the pitch or roll orientations of the toy bird nor does it allow for simulation of the posture of the wings of a bird approaching landing. Additionally, the toy bird cannot be controlled to simulate fight or landing at a specific location which is different from that of the user holding the string.

U.S. Pat. No. 810,690 by Weiss also discloses an inflatable toy bird inflated with a gas of a specific gravity less than that of atmospheric air, which when inflated, will float in the air. Again, the toy bird is held by means of a string attached to its underside. Like Bellamy, Weiss does not allow for controlling the pitch or roll orientations of the toy bird nor does it allow for simulation of the posture of the wings of a bird in flight or approaching landing. Further, like Bellamy, the toy bird cannot be controlled to simulate different stages of landing at a specific location which is different from that of the user holding the string.

U.S. Pat. No. 1,562,625 by Fife also discloses an inflatable toy bird inflated with air and controlled by an elastic string attached to its feet. Like Bellamy and Weiss, Fife does not allow for controlling the pitch or roll orientations of the toy bird nor does it allow for simulation of the posture of the wings of a bird approaching landing. And, like Bellamy and Weiss, the toy bird cannot be controlled to simulate landing at a specific location which is different from that of the user holding the string.

SUMMARY OF THE INVENTION

It is an object of the present invention to provide a waterfowl decoy system which can simulate the different landing stages of a bird at a predetermined location different from that of the user. It is a further object of the invention that the flight orientation and posture of the waterfowl decoy resemble an actual waterfowl which is landing.

Accordingly, in one aspect of the present invention, a waterfowl decoy system is provided. The system includes at least one waterfowl decoy having a specific gravity less than that of air which is secured to a tethering means. Altitude control means are additionally provided for deploying and retrieving the tethering means, wherein the altitude of the waterfowl decoy may be controlled from a remote location. Guide means may also be provided to guide the tethering means through a predetermined location wherein the waterfowl decoy may simulate different stages of landing at a predetermined location.

According to another embodiment of the invention, the waterfowl decoy resembles a desired bird in every visual and physical characteristic. Further, the waterfowl decoy may utilize a bladder for retaining a gas having a specific gravity less than air and which is preferably puncture resistant to brush, bushes and other ground cover found in a typical outdoor environment. Also, the waterfowl decoy will be configurable to simulate the orientation and posture of the bird in different flight stages, i.e., landing, approaching the ground, or level flight, depending on the height of the waterfowl decoy in the air and the desired simulation.

According to yet another embodiment of the invention, multiple waterfowl decoys may be connected to the tethering means to simulate the flight of multiple birds, i.e., flocking. Further, the guiding means may include a screw adapted to screw into the soil and having an eyelet through which the tethering means may be passed. Also, the altitude control means may include a manual, mechanical or electrical winding mechanism.

According to another aspect of the present invention, a method for controlling at least one waterfowl decoy having a specific gravity less than air is provided, including the steps of connecting the waterfowl decoy to a tethering means, connecting the tethering means to an altitude control means and then positioning the tethering means through a guide means secured at a predetermined location. The decoy is then released wherein the tethering means substantially maintains the elevation of the waterfowl decoy above the Earth's surface and the waterfowl decoy is then deployed or retrieved using the altitude control means. The waterfowl decoy thus moves toward the guide means and appears that it will land at that predetermined location.

According to yet another aspect of the present invention, a waterfowl decoy apparatus is provided which may be adjusted to resemble the flight orientation and posture of a flying or landing waterfowl. The apparatus includes a waterfowl decoy and a pitch control line having a first end and a second end. The ends of the pitch control line are interconnected to the lower surface of the waterfowl decoy substantially spaced apart and substantially adjacent to the roll axis of the waterfowl decoy. Fixation means are provided for interconnecting the first end of a tether to the pitch control line wherein the fixation means allows for fixation of the first end of the tether along the pitch control line. The flight orientation of the waterfowl decoy may be adjusted by moving the fixation means along the pitch control line in relation to the center of gravity of the waterfowl decoy thus causing the waterfowl decoy to assume a flight orientation with relation to the Earth's surface. The second end of the tether is operatively interconnected to an altitude control means, wherein the altitude of the waterfowl decoy may be controlled from Earth's surface by deploying or retrieving the tether.

In a preferred embodiment, a roll control line is provided having a first end and a second end interconnected to the lower surface of the waterfowl decoy substantially spaced apart, substantially adjacent to the pitch axis, and substantially equidistant from the center of gravity of the waterfowl decoy. Further, the fixation means includes means for fixation of the first end of the tether along the roll control line. Again, the flight orientation of the waterfowl decoy may be adjusted by moving the adjustable orientation clamp along the roll control line in relation to the center of gravity of the waterfowl decoy, causing the waterfowl decoy to assume a predetermined flight orientation with relation to the Earth's surface.

DETAILED DESCRIPTION OF THE INVENTION

Figure 1:
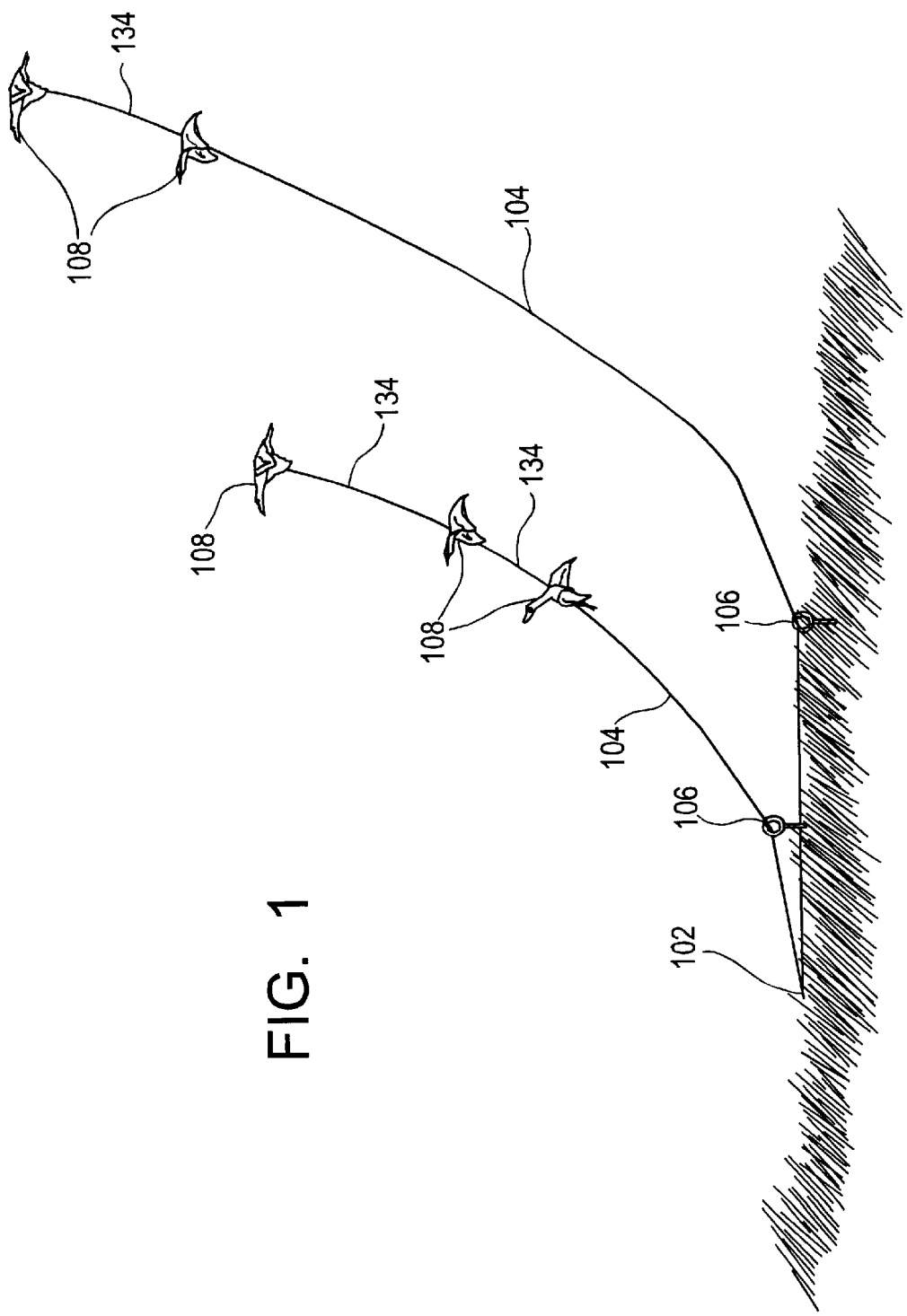
FIG. 1 illustrates a waterfowl decoy system according to one embodiment of the present invention.

Referring to FIG. 1, there is illustrated a waterfowl decoy system. The system includes altitude control means 102, tethering means 104, guide means 106, and at least one waterfowl decoy 108. The waterfowl decoy 108 has a specific gravity less than that of air. Preferably, the waterfowl decoy 108 is a bird-shaped lightweight model resembling the bird of choice in shape, size and coloring. The waterfowl decoy 108 may also include any game bird such as a dove, pigeon, crow or crane. The preferred construction of the waterfowl decoy 108 is described further hereinbelow.

The tethering means 104 is interconnected to the waterfowl decoy 108 and can comprise mono-filament polyester line, fusion processes fishing line, braided string, kite string, or any other lightweight line or cord having adequate tensile strength to retain the airborne waterfowl decoy 108 in winds of up to 30 miles per hour.

The guide means 106 directs the tethering means 104 to the altitude control means 102 at the user's location and functions to direct the waterfowl decoy 108 toward or away from a predetermined location where the guide means 106 is placed. In one embodiment, the guide means 106 comprises an eye-screw that can be screwed into the ground to an approximate depth of 6–10 inches, with an eyelet approximately 2 inches in diameter. In another embodiment, the guide means 106 comprises an eye-stake which can be driven into hard or frozen ground while the eyelet remains above the ground. In yet another embodiment, the guide means 106 comprises a weight with an eyelet interconnected thereto. In another embodiment, the guide means 106 may include a pulley or wheel to reduce the friction imparted upon the tethering means 104.

The altitude control means 102 is a winding mechanism which can comprise a manual, mechanical or electrical winding mechanism such as a small electric winch or a fishing pole and reel. However, the altitude control means 102 can also include manual deployment or retrieval of the tethering means 104 by the user merely using one's hands. More than one waterfowl decoy 108 may be interconnected to the system using intermediate tethering means 134. Similarly, more than one tethering means 104 may be interconnected to the altitude control means 102 to simulate flocking birds.

In a preferred embodiment of the present invention, the waterfowl decoy 108 is constructed of a high tensile strength material which is pliable, abrasion and puncture resistant, paintable, light weight and with low permeability to gases and having shape memory in hot and cold temperatures. Candidate materials may include Polyethylene Terephthalate (PET) films, and Polyethylene Naphthalate (PEN) films. Examples of these films are sold under the trademarks MYLAR or DARTEK. Each of these thermoplastic polyesters exhibit excellent strength to weight ratios, high tensile strengths, good performance at different temperatures, and the ability to be formed by numerous methods. In general, the PEN films exhibit better properties than the PET films, however PEN objects are more expensive to manufacture.

In another preferred embodiment of the present invention, the waterfowl decoy 108 is constructed using either a known general blow/injection molding process, a known thermoformed drawing process or a known thermoformed shrinking process.

In yet another preferred embodiment of the present invention, the waterfowl decoy 108 has simulated feathers achieved by constructing the waterfowl decoy 108 with a textured surface resembling feathers. This can be accomplished using known techniques in a thermoform shrinkable version of PET or PEN films, around a positive mold, or vacuum thermoforming in a negative mold. The texture of feathers can also be accomplished using known blow molding, thermoforming, or direct injection molding techniques.

Figure 2:
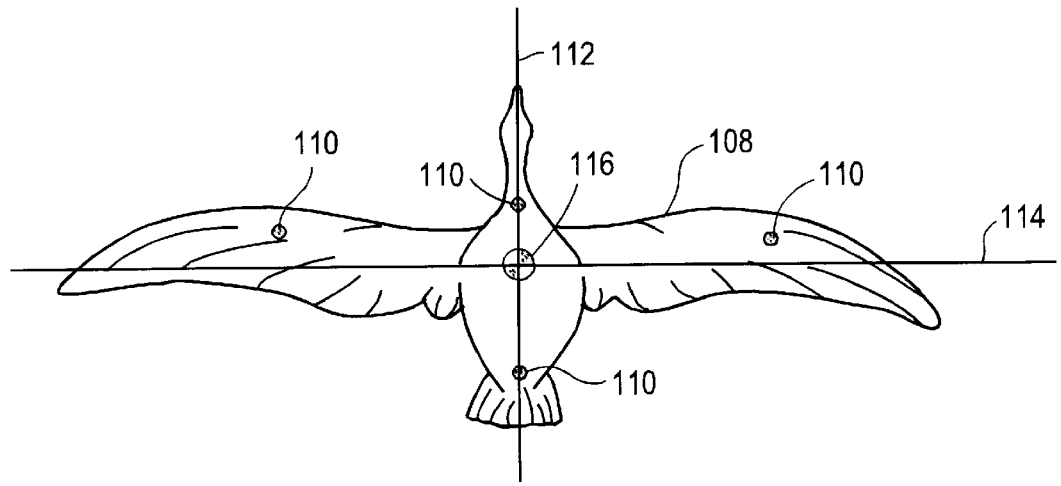
FIG. 2 illustrates the lower surface of a waterfowl decoy comprising the wings, body, tail, neck and head of the waterfowl decoy.

Referring to FIG. 2, there is illustrated the lower surface of a waterfowl decoy 108 including the lower surface of the wings, body, tail, neck and head. In an embodiment of the present invention, the waterfowl decoy 108 has a roll axis 112, a pitch axis 114 and a center of gravity 116. The roll axis 112, pitch axis 114, and center of gravity 116 are references for the preferred interconnection of grommets 110 to the waterfowl decoy 108. The grommets 110 will be hereinbelow described in further detail.

Figure 3:
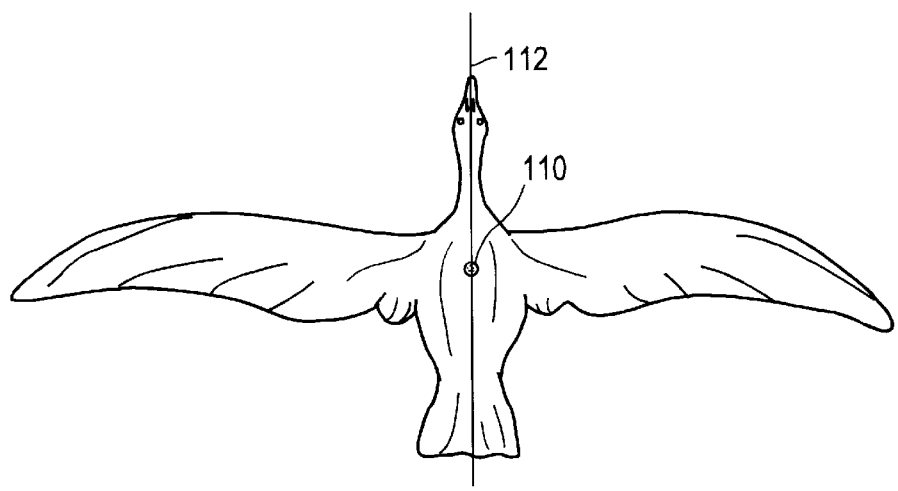
FIG. 3 illustrates the upper surface of a waterfowl decoy comprising the wings, body, tail, neck and head of the waterfowl decoy.

Referring to FIG. 3, there is illustrated the upper surface of a waterfowl decoy 108 including the upper surface of the wings, body, tail, neck and head. The roll axis 112 is a reference for the preferred interconnection of a grommet 110 to the upper surface of the waterfowl decoy 108.

Figure 4:
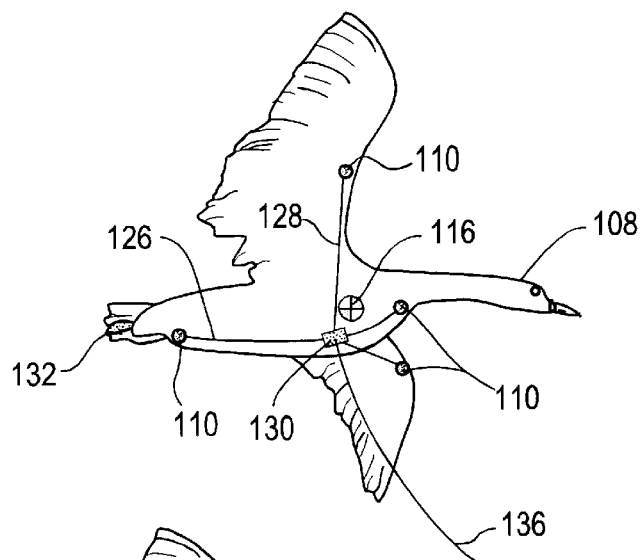
FIGS. 4, 5, and 6 illustrate lower oblique views of a waterfowl decoy having a roll control line and a pitch control line interconnected to the lower surface thereof. A tether is interconnected to an adjustable orientation clamp affixed at the intersection of the lines as shown in various positions in relation to the center of gravity of the waterfowl decoy according to an embodiment of the invention.
Figure 5:
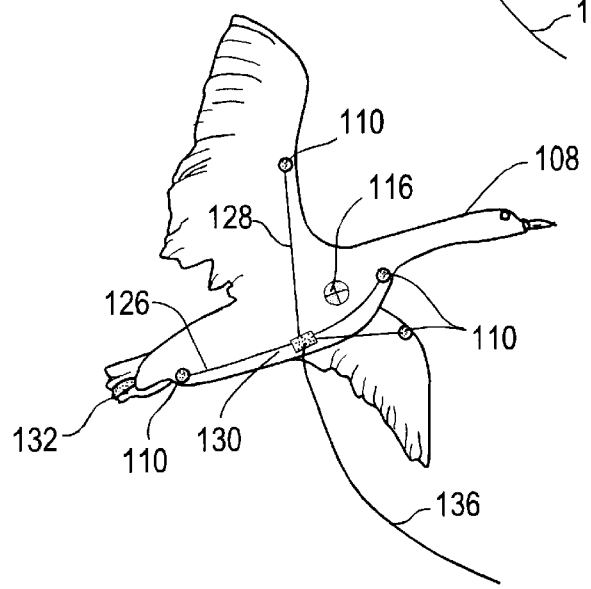
Figure 6:
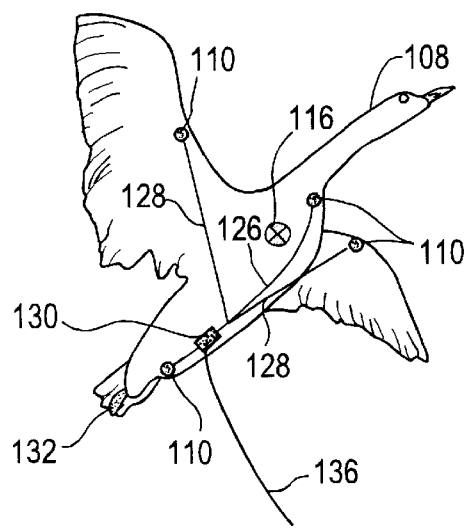

Referring to FIGS. 4, 5 and 6 there is illustrated lower oblique views of a waterfowl decoy 108 with an adjustable orientation clamp 130 affixed in various positions along a pitch control line 126 and a roll control line 128 and interconnected to a tether 136 according to an embodiment of the invention. In a preferred embodiment of the present invention, the ends of the pitch control line 126 are interconnected to grommets 110 which in turn are interconnected to the lower surface of the waterfowl decoy 108, preferably, substantially adjacent to the front and rear of the waterfowl decoy 108 and substantially adjacent to the roll axis 112 as illustrated in FIG. 2. In another preferred embodiment of the present invention, the ends of the roll control line 128 are interconnected to grommets 110 which in turn are interconnected to the lower surface of the waterfowl decoy 108, preferably, substantially spaced apart and adjacent to the pitch axis 114, equidistant from the center of gravity 116 and to the left and right of the roll axis 112, as illustrated in FIG. 2.

In a preferred embodiment of the present invention, a check valve 132 is located on the lower surface of the waterfowl decoy 108. The check valve 132 is used to inflate and deflate the waterfowl decoy 108. In an embodiment of the present invention, inflation is achieved using a needle similar to those available to inflate sport balls connected to a pressurized tank of gas such as a helium. Deflation is achieved using the needle alone placed in the check valve 132 allowing the gas to escape. When a needle is not inserted, the check valve 132 remains closed due to the pressure of the inserted gas.

Figure 7:
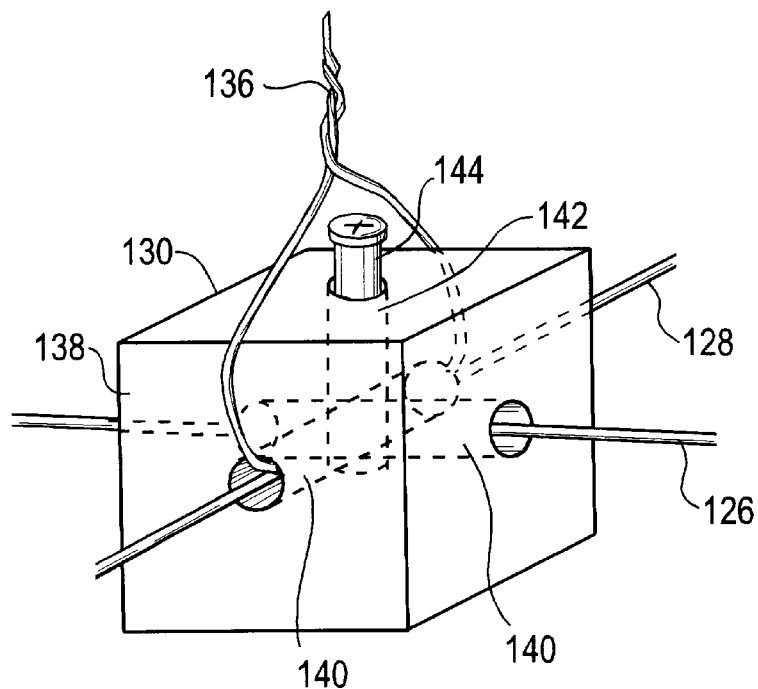
FIG. 7 illustrates an adjustable orientation clamp according to one embodiment of the invention.

Referring now to FIG. 7, an adjustable orientation clamp 130 is illustrated which comprises a body 138 having two intersecting bores 140 substantially perpendicular to each other and extending through the body 138 and a third internally threaded bore 142 intersecting the two intersecting bores 140 substantially perpendicular thereto. In a preferred embodiment of the present invention, the pitch control line 126 and the roll control line 128 are positioned within the intersecting bores 140 while an externally threaded clamping bolt 144 is tightened in the internally threaded bore 142, compressing the pitch control line 126 and the roll control line 128 and thus fixing the position of the intersection of the roll control line 128 and the pitch control line 126. This allows for positioning and fixation of the tether 136 relative to the center of gravity 116 of the waterfowl decoy 108 as illustrated in FIG. 2 thereby allowing alteration of the flight orientation of the waterfowl decoy 108.

Referring to FIG. 4, the adjustable orientation clamp 130 is affixed to the roll control line 128 and the pitch control line 126 substantially adjacent to the center of gravity 116 such that the waterfowl decoy 108 appears to be in a level flight orientation.

Referring to FIG. 5, the adjustable orientation clamp 130 is affixed to the roll control line 128 and the pitch control line 126 midway between the rear of the waterfowl decoy 108 and the center of gravity 116 such that the waterfowl decoy 108 appears to be in an approximate 10° angle of flight orientation from horizontal, typical of a bird's flight approaching a landing site but before landing.

Referring now to FIG. 6, the adjustable orientation clamp 130 is affixed to the roll control line 128 and the pitch control line 126 substantially adjacent to the rear of the waterfowl decoy 108 and away from the center of gravity 116 such that the waterfowl decoy 108 appears to be in the extreme flight orientation typical of a landing bird.

The adjustable orientation clamp 130 may also be positioned to the right or left of the roll axis 112 causing the waterfowl decoy 108 to roll to the right or left thus simulating the banking turn of a waterfowl in flight. In one embodiment of the present invention, the tether 136 is interconnected to the adjustable orientation clamp 130 by positioning the end of the tether 136 through one intersecting bore 140 and tying or otherwise affixing the tether 136 to itself. In another embodiment, the adjustable orientation clamp 130 can comprise a spring-loaded clamp rather than the clamping bolt 144. In yet another embodiment, the adjustable orientation clamp 130 can comprise a knot.

In another preferred embodiment of the present invention, moving the adjustable orientation clamp 130 toward the rear of the waterfowl decoy 108 pulls the roll control line 128 taught and causes the wings of the waterfowl decoy 108 to be drawn down and inward into a cupped posture. Thus, as the angle of attack is increased by moving the adjustable orientation clamp 130 rearward, different postures that a bird assumes during descent and landing are simulated.

Figure 8:
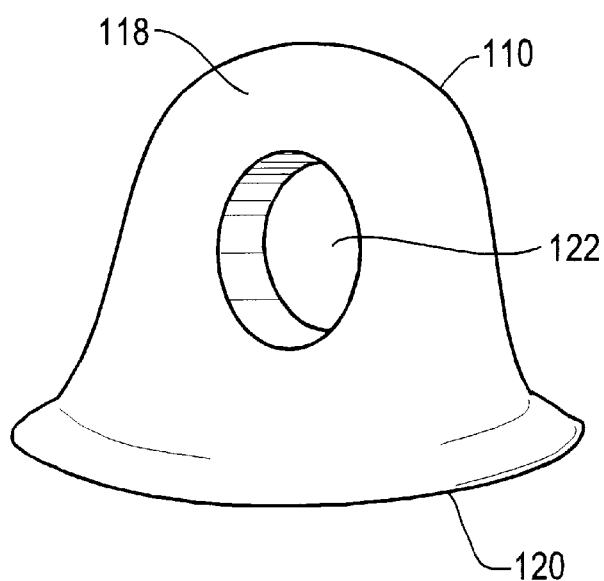
FIG. 8 illustrates a grommet according to one embodiment of the invention.

Referring to FIG. 8 there is illustrated a grommet 110 comprising a body 118 having a base 120 and an eyelet 122. In a preferred embodiment of the present invention, the grommet 110 is molded of a lightweight and pliable material such as plastic and is of such a material which can be glued or otherwise bonded to the surface material of the waterfowl decoy 108 to provide an upper or lower attachment mechanism for interconnecting the decoy to a tether which is in turn interconnected to another decoy or an altitude control mechanism such as a reel. In another embodiment of the invention, the grommet 110 is molded into the surface of the waterfowl decoy 108. The grommet 110 can comprise a variety of shapes adapted to allow a line or cord to be tied or otherwise interconnected thereto and adapted to have a contact surface area with the waterfowl decoy 108 sufficient to permit a high-strength glued, bonded or molded connection. In a preferred embodiment, the body 118 is an elliptical form with a base 120 having a substantially circular flat surface to accommodate a glued or otherwise bonded connection to the surface of the waterfowl decoy 108. The eyelet 122 comprises a substantially circular transversal hole with a diameter sufficient to allow a string or cord to be easily passed therethrough.

While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A waterfowl decoy system comprising:
   (a) at least one waterfowl decoy having a specific gravity less than air and capable of being suspended above the Earth's surface, said waterfowl decoy further comprising a lower surface and an upper surface;
   (b) tethering means having a first end interconnected to said lower surface of said waterfowl decoy;
   (c) altitude control means operatively interconnected to a second end of said tethering means, wherein the altitude of said waterfowl decoy may be controlled from a remote location;
   (d) guide means slidingly engaged to a portion of said tethering means between said first end and said second end for positioning said waterfowl decoy in relation to a predetermined location;
   (e) an orientation means interconnected to said lower surface of said water fowl decoy and to said first end of said tethering means to control the flight orientation of said waterfowl decoy, said orientation means comprising a pitch control line having a first end operatively interconnected to a forward portion of said lower surface of said waterfowl decoy and a second end operatively interconnected to a rearward portion of said lower surface of said waterfowl decoy; and
   (f) fixation means interconnecting said first end of said tethering means to said pitch control line between said first end and said second end of said pitch control line, wherein the orientation of said at least one waterfowl decoy in said waterfowl decoy system can be adjusted.

2. The waterfowl decoy system of claim 1 wherein said orientation means further comprises:

(a) a roll control line having a first end operatively interconnected to a right portion of said lower surface of said waterfowl decoy and a second end operatively interconnected to a left portion of said lower surface of said waterfowl decoy for interconnection to said fixation means, wherein the roll of said waterfowl decoy can be adjusted by changing the position where the fixation means is interconnected to said roll control line.

3. The waterfowl decoy system of claim 1 wherein at least a portion of said waterfowl decoy has simulated feathers and said waterfowl decoy substantially resembles a waterfowl in flight.

4. The waterfowl decoy system of claim 1 wherein said waterfowl decoy comprises at least two wings and a head portion operatively interconnected to a bladder capable of being inflated and deflated with a gas having a specific gravity less than that of air, said bladder constructed of a material substantially impermeable to said gas.

5. The waterfowl decoy system of claim 4 wherein said bladder is constructed of a substantially puncture resistant material.

6. The waterfowl decoy system of claim 1 further comprising:

(a) upper-attachment means interconnected to said upper surface of first said waterfowl decoy; and (b) intermediate tethering means having a first end and a second end wherein said first end is interconnected to said upper-attachment means and said second end is interconnected to said orientation means interconnected to said lower surface of second said waterfowl decoy.

7. The waterfowl decoy system of claim 1 wherein said altitude control means is manually operated.

8. The waterfowl decoy system of claim 1 wherein said altitude control means comprises a manual or motor driven winding mechanism.

9. The waterfowl decoy system of claim 1 wherein said guide means comprises an eye-screw or eye-stake.

10. The waterfowl decoy system of claim 1, wherein said fixation means comprises an adjustable orientation clamp.

11. A method for controlling at least one waterfowl decoy having a specific gravity less than that of air and having an upper surface and a lower surface, comprising the steps of:

(a) interconnecting a first end of a tethering means to an orientation means interconnected to said lower surface of said waterfowl decoy, said orientation means comprising a pitch control line having a first and operatively interconnected to a forward portion of said lower surface of said waterfowl decoy and a second end operatively interconnected to a rearward portion of said lower surface of said waterfowl decoy and an adjustable orientation clamp interconnecting said first end of said tethering means to said pitch control line between said first end and said second end of said pitch control line;

(b) positioning said tethering means through a guide means placed at a predetermined location on the earth's surface;

(c) connecting a second end of said tethering means to an altitude control means;

(d) releasing said waterfowl decoy wherein said tethering means substantially maintains the altitude of said waterfowl decoy above the Earth's surface at said predetermined location; and (e) retrieving said waterfowl decoy using said altitude control means, wherein said altitude control means reduces the operable length of said tethering means and wherein said waterfowl decoy travels toward said predetermined location.

12. The method of claim 11 further comprising the step of maintaining a plurality of said waterfowl decoys in interspatial relation above the Earth's surface by interconnecting said waterfowl decoys with an intermediate tethering means.

13. The method of claim 11, wherein said waterfowl decoy is comprised of at least a bladder constructed of a material substantially impermeable to a gas having a specific gravity less than that of air.

14. The method of claim 11 further comprising the steps of:

(a) interconnecting an upper-attachment means to said upper surface of first said waterfowl decoy;

(b) interconnecting a first end of an intermediate tethering means to said upper-attachment means; and (c) interconnecting a second end of said intermediate tethering means to said lower surface of second said waterfowl decoy.

15. The method of claim 11 wherein said altitude control means comprises a manual or motor driven winding mechanism.

16. The method of claim 11, further comprising the step of interconnecting a roll control line to said at least one waterfowl decoy, said roll control line having a first end operatively interconnected to a lower surface of a right wing of a waterfowl decoy and a second end interconnected to a lower surface of a left wing of said waterfowl decoy.

17. A waterfowl decoy apparatus capable of being suspended in air above the Earth's surface comprising:

(a) a waterfowl decoy having a specific gravity less than that of air, said waterfowl decoy further comprising a lower surface and an upper surface;

(b) a pitch control line having a first end operatively interconnected to a forward portion of said lower surface of said waterfowl decoy and a second end operatively interconnected to a rearward portion of said lower surface of said waterfowl decoy;

(c) a roll control line having a first end operatively interconnected to a right portion of said lower surface of said waterfowl decoy and a second end operatively interconnected to a left portion of said lower surface of said waterfowl decoy; and (d) fixation means interconnecting a first end of a tether to said pitch control line between said first end and said second end of said pitch control line, and between said first end and said second end of said pitch control line, and said second end of said tether is operatively interconnected to an altitude control means adjacent to the Earth's surface, wherein the altitude and orientation of the waterfowl decoy can be selectively adjusted.

18. The apparatus of claim 17 further comprising:

(a) upper-attachment means interconnected to said upper surface of first said waterfowl decoy; and (b) intermediate tethering means having a first end and a second end, said first end interconnected to said upper-attachment means and said second end interconnected to a lower portion of a second waterfowl decoy.

* * * * *